United States Patent [19]

Christensen et al.

[11] 4,419,736
[45] Dec. 6, 1983

[54] TELEPRINTER TERMINAL

[75] Inventors: Gay A. Christensen, Dayton, Ohio; Gerard Franco; Theron L. Wildey, both of Ithaca, N.Y.

[73] Assignee: NCR Corporation, Dayton, Ohio

[21] Appl. No.: 149,207

[22] Filed: May 12, 1980

[51] Int. Cl.³ .............................. G06F 3/00; G06F 3/12
[52] U.S. Cl. .................................................. 364/900
[58] Field of Search ... 364/700 MS File, 900 MS File

[56] References Cited

U.S. PATENT DOCUMENTS

| 4,004,280 | 1/1977 | Vandierendonck | 364/900 |
|---|---|---|---|
| 4,084,680 | 4/1978 | Deetz | 364/900 |
| 4,114,026 | 9/1978 | Florenza | 364/900 |
| 4,145,756 | 3/1979 | Cochran et al. | 364/900 |
| 4,146,922 | 3/1979 | Brown et al. | 364/900 |
| 4,156,931 | 5/1979 | Adelman et al. | 364/900 |
| 4,159,882 | 7/1979 | Sanders et al. | 364/900 |
| 4,264,208 | 5/1980 | McCarthy | 364/900 |

Primary Examiner—Gareth D. Shaw
Assistant Examiner—John G. Mills
Attorney, Agent, or Firm—J. T. Cavender; Wilbert Hawk, Jr.; George J. Muckenthaler

[57] ABSTRACT

A teleprinter terminal includes a keyboard and a printer, each of which is operated by means of a self-contained microprocessor, and a third microprocessor is programmed to handle the communications. The three microprocessors are interconnected to operate in a four-bit bus manner wherein communications between the processors is done in bytes but the four-bit bus forces the byte to be transferred in two, four-bit exchanges. One four-bit bus is used to connect the communications processor with the keyboard processor and with the printer processor and a second four-bit bus is used to connect the keyboard processor and the communications processor.

12 Claims, 12 Drawing Figures

TELEPRINTER TERMINAL

BACKGROUND OF THE INVENTION

In the field of printing terminal apparatus, it has been common design practice to use a thermal-type printer along with a keyboard-operated input and a central processing unit for controlling the several functions. While thermal-type printers may include a stationary member containing a plurality of thermal elements, such printers may be of the type which have one or more print heads driven inside-to-side manner and which include thermal elements for printing either in dot matrix or in character form.

Prior thermal-type printers have used the central processing unit as a central controller for the several functions with required storage capacity within the system for enabling the operations in timed manner.

It is desired to increase the print quality and print speed of the thermal-type dot matrix printer and accordingly to provide additional function and features in the system of these printers.

Representative prior art in the field of thermal printers includes U.S. Pat. No. 3,476,877, issued to P. E. Perkins et al. on Nov. 4, 1969, which discloses a teleprinter using thermal printing techniques under the control of a data processor which supplies both clock and information signals to the remote thermal printer. A shift register sequentially stores groups of data bits transmitted from the data processor and binary counting means is used to control the sequential energization of selected groups of the thermal printing elements.

U.S. Pat. No. 4,020,465 issued to M. J. Cochran et al. discloses a thermal line printer having a printer chip which is operated to generate its own internal commands and clock signals, and is interconnected with an arithmetic chip and with a scanning and read-only-memory (SCOM) chip. Auxiliary chips include register chips, a programmer chip and a read-only-memory (ROM) chip. The sequential access memory stores multi-bit words for each character to be printed with a commutator reading the words from memory for each line to be printed. The read only memory (ROM) has a dot matrix code therein for each character, and a time sequencer and decoder connected thereto is synchronized with the commutator to produce a different output from the ROM for each reading of each given word from memory.

It is therefore proposed to control the thermal printer in a manner wherein independent controls are provided for the several functions rather than relying on a central processing unit.

SUMMARY OF THE INVENTION

The present invention relates to a printing system and more particularly, to a teleprinter terminal which utilizes a microprocessor-controlled keyboard, a microprocessor-controlled communication interface, and a mmicroprocessor-controlled thermal printer mechanism. Each microprocessor is a single chip device containing an independent program and data memory for its special purpose functions.

The teleprinter terminal is a point-to-point communications device which prints data transmissions using the dot matrix thermal printer for printing over an eighty character width line. The apparatus includes features for operating in a receive only (RO) mode or in a keyboard send/receive (KSR) mode. The receive only model includes the thermal printer along with communications and control electronics and a power supply whereas the keyboard send/receive model additionally includes a communications keyboard and internal control electronics.

The printer processor is a slave to the communications or the keyboard processor and converts data input into a dot pattern for printing. The performance functions of the printer processor include the generation of the characters to be printed, the controlling of the movement of the print head motor, and the actual firing of the elements for making up the dots of the characters. The printer processor also communicates with the other processors or chips during carriage return and line feed operations of the printer in the non-printing condition.

The keyboard processor senses the keys on the keyboard which are operated and sends the information to the communications processor and/or the printer processor. The keyboard processor or chip provides N-key roll over and repeat functions.

The communications processor decodes input data received in either serial or parallel manner and sends the data to the printer as well as encoding data from the keyboard into serial form for transmission. The communications processor is in communication with the outside world and with the other two processors during operations of the printer.

The keyboard provides coded information as input to the printer as well as for transmission of data via communication lines to remote devices. Communications between the processors is performed in bytes but the four-bit bus forces the byte to be transferred in two four-bit exchanges or nibbles. The two four-bit buses are used to transmit data between the three microprocessors in a manner wherein both buses exchange the data at the lower nibble prior to exchange of data at the higher nibble. In this manner, the sending processor places the lower nibble of data on the bus prior to placing the upper nibble on the data bus during sending of information between the processors.

In view of the above discussion, the principal object of the present invention is to provide printing apparatus having individual controllers for the several functions.

Another object of the present invention is to provide teleprinting apparatus for operating in a receive only mode or in a keyboard send/receive mode.

An additional object of the present invention is to provide teleprinting apparatus wherein the individual controllers are self-contained and control the several functions according to the program for each processor.

A further object of the present invention is to provide bus protocol for a teleprinter apparatus wherein communications between the several processors is done in bytes but the bus forces the byte to be transferred in multiple exchanges. The exchange or transfer of data in "nibbles" enables the input-output lines on each microprocessor to be available to perform other functions rather than normal use to exchange data in bytes.

Additional advantages and features of the present invention will become apparent and fully understood from a reading of the following description taken together with the annexed drawing.

DESCRIPTION OF THE PREFERRED EMBODIMENT

Prior to discussing the several Figures of the drawing, it is probably necessary to generally describe the terminal apparatus of the present invention as including an 80 column, non-impact thermal printer capable of printing 30 characters per second in a format wherein the character spacing is 10 characters per inch in the horizontal direction and the line spacing is six lines per inch. The individual characters are made up of a $5 \times 7$ matrix printed on heat-sensitive thermal paper.

The terminal apparatus, or more appropriately named, the thermal teleprinter, is a microprocessor-based asynchronous point-to-point communications device which prints data transmissions in the manner as described above. There are two models of the terminal. A receive only (RO) model of the teleprinter includes in a single package the thermal printer, communications and control electronics and a power supply. A keyboard send/receive (KSR) model includes the above elements and is identical to the receive only model except for the addition of a keyboard and internal control electronics. The internal design of the system includes the three independent microprocessors that run simultaneously to perform the required functions.

The tasks of the communications processor include operator programmability of baud rate and parity, conversion of parallel output data to serial asynchronous format, conversion of incoming serial asynchronous data to parallel data, and processing of parallel received data. Further, the processor provides for parity generation and parity detection, monitoring printer status and routing data to the printer. Additionally, the processor polls the keyboard, processes a paper out condition, and provides for interpretation of the code from the bell.

The printer processor tasks include communicating to the keyboard processor and the communications processor, control of print head bit times, and control of the print head carriage stepping motor. Further, the printer processor monitors and processes paper advance signals, has control of the line feed stepping motor, has control of a solenoid during carriage return/line feed, and buffers data during carriage return. Additionally, the printer processor monitors two motion sensors and generates the $5 \times 7$ printing character fonts from a look-up table resident within the processor. Printing is done "on the fly" wherein the processor fires one column of the $5 \times 7$ dot matrix at a time in forming a character image on the heat-sensitive thermal paper, and at the same time the processor is changing the phases of the stepping motor to advance the print head across the paper until all 5 columns are printed.

The function of the keyboard send and receive (KSR) model is to provide coded information as input to the printer from the keyboard as well as for the transmission of data via communication lines to and from remote devices such as other terminals or central computers in a manner where the keyboard processor communicates to the communications processor and to the printer processor. The keyboard contains keys for the entering of upper and lower case alphanumeric characters and control characters and for providing control of terminal operations.

More specifically, the tasks of the keyboard processor include the continuous scanning of the unencoded keyboard for sensing key conditions, the performing of unshifting, shifting, control and numeric operations on all keys of the keyboard, the differentiating between ASCII keys, function keys and status keys, and the ringing of the bell in the KSR mode. Further, this processor is slaved to the communications processor, it can stack up to 24 characters entered through the keyboard, it alerts the printer processor whenever data is ready, and it performs N-key rollover wherein when one key is depressed on the keyboard and a second key is depressed before the first key is released, the printing of the first and the second keys along with successive depressed keys will be performed. Additionally, the keyboard processor performs the repeat function on specified keys after a predetermined delay, the processor performs the upper/lower shift option, keeps a running register of the status of the unit, and a register of half/full control and on line/local control.

The repeat feature is activated when a key is depressed longer than the normal amount of time and the key is repeated at the strapped baud rate until such key is released or until another key is depressed. The upper/lower shift is controlled by a strap on one of the input lines to the processor. In normal use, when a key is depressed, the upper case letter is printed and when in shift mode (shift key depressed) the lower case letter is printed. When the terminal is strapped for upper-lower shift, the opposite is true. In shift mode the upper case letter is printed and in unshifted mode the lower case letter is printed. The control mode (control key depressed) activates the carriage return, line feed, backspace and ringing of the bell. The numeric mode converts the keyboard into a $3 \times 3$ numeric keypad as depicted on the key tips.

The keyboard send/receive (KSR) model interface can send and receive all 128 characters of the ASCII code and the communications, using the (KSR) terminal, can be performed over private, leased lines or public, switched lines. The mode of transmission can be either the half duplex two-way alternate or it may be full duplex two-way simultaneous mode over a two-wire or four-wire link. The transmission speed or baud rate and type of parity checking desired are able to be programmed by the operator using a simple keyboard selection technique.

The communications processor communicates to the outside world by one of two communications protocols. One is the Electronic Industry Association (EIA) standard protocol and the other is a parallel receive-only protocol. When the parallel protocol is used, data is input 7 bits at a time. The keyboard and the keyboard processor are omitted from the terminal and such terminal becomes a receive-only model. The receive only (RO) model can communicate in only one direction, i.e. receive all 128 characters of the ASCII code. The baud rate and parity are set at values which are specified by the installation and cannot be changed by the operator.

This model can be connected to half and full duplex communications lines, but the method of transmission is simplex or one-way.

When the EIA standard protocol is used, data is received and transmitted serially. The asynchronous transmission method of performing communications indicates that the time between characters is not critical, but the flow of bits making up the character must be maintained at a fixed rate and the asynchronous transmission of the character immediately occurs each and every time that the operator presses a key on the KSR keyboard. The arrangement of bits in each character receipt and character transmission of 150, 200 and 300 baud rates is a start bit followed by seven ASCII code data bits, a parity check bit and a stop bit. Character transmission at 110 baud rate is the same as 150, 200, and 300 with the exception that there are two stop bits in each character. The rate of the transmission and the parity are determined by straps in the terminal.

The RO model communications uses the simplex method whereas the KSR model communications can be performed using either the half duplex or the full duplex method of transmission and wherein the latter method enables the sending and the receiving of data between a terminal and a remote station at the same time. A common practice is not to permit simultaneous transmission in both directions but to implement the capability of the full duplex mode under half duplex conditions. A full duplex communications line arrangement using the half duplex method offers timing advantages over the normal use of half duplex because the time lag is eliminated. When the half duplex method is used, a time lag occurs each time the direction of transmission is reversed. This time lag is eliminated with full duplex facilities operated under half duplex conditions because the data set incorporates two transmission frequencies or channels wherein each is constantly ready for transmission in the opposite direction. In the half duplex mode, the printer accepts data from both the keyboard and the communications line.

When the full duplex capability is used in the full duplex mode, data transmission occurs in both directions at the same time and when the apparatus is in such full duplex mode, the printer is dedicated to the communications line so that data from the keyboard is not printed. An application of the full duplex mode is a positive visual check of the data transmitted from the KSR terminal wherein transmissions from the terminal are immediately returned to the terminal printer when received by the remote station. The keyboard is dedicated to the transmission lines during fully duplex operation and only the data that is received at the remote station and then returned to the sending terminal is printed so as to provide an immediate check on the accuracy of the transmission.

Figure 1:
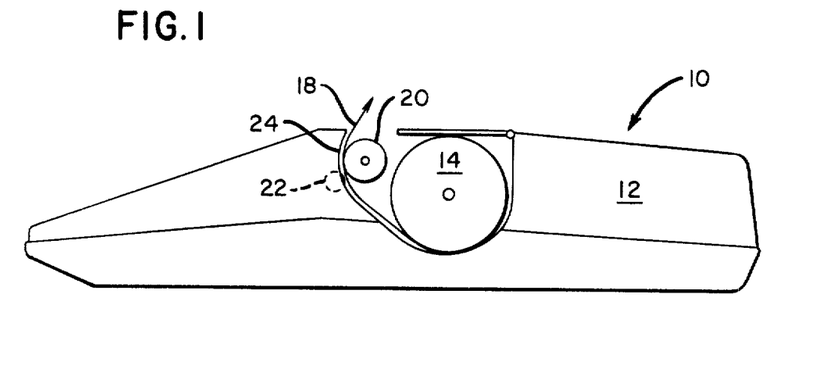
FIG. 1 is a side elevational view of a printer incorporating the subject matter of the present invention.

Referring now to the drawing, FIG. 1 shows a side elevational view of a teleprinter terminal generally designated as 10 and having an enclosure 12 for containing a roller 14 for dispensing thermal paper 18 or like record media. A paper advance roller 20 is caused to drive the paper 18 past a tension roller 22 and through a paper feed slot 24.

Figure 2:
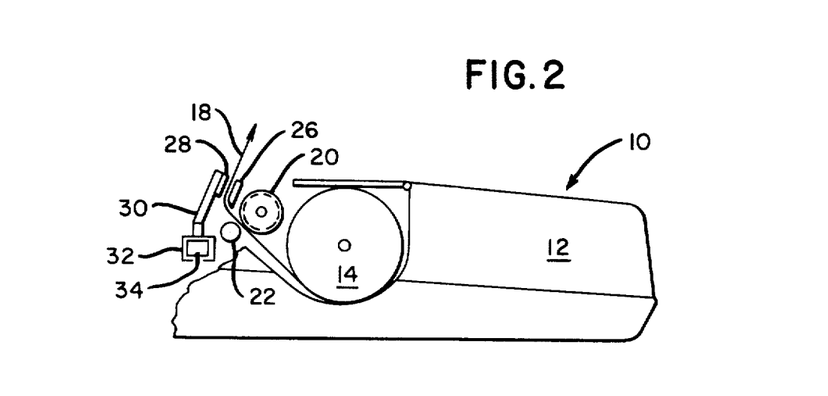
FIG. 2 is a similar view showing additional portions of the printer.

As better illustrated in FIG. 2, the paper 18 follows a path past the roller 20 and the roller 22 and in front of a platen 26 suitably supported across the terminal. A thermal print head 28 is supported at an angle by means of an arm 30 from a print head carriage 32 carried along a bar or shaft 34 to guide the print carriage in back-and-forth manner across the printer. The print head includes nine thermal elements disposed in alignment so as to mark the paper as it is transported or caused to be advanced past the platen 26. A permanent magnet type stepping motor may be utilized to move the print head carriage 32 back and forth in alternate print and carriage return modes.

Figures 3, 3B:
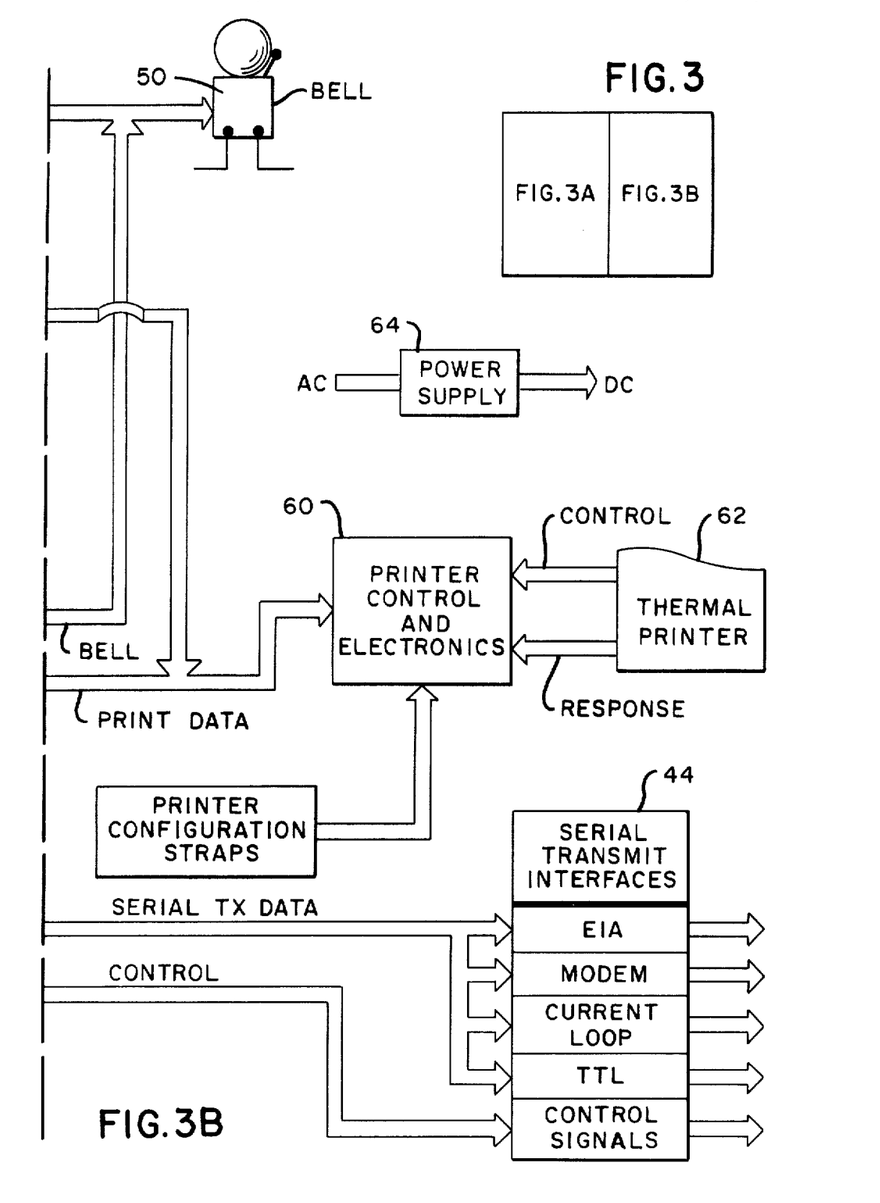
FIG. 3 is a view of the arrangement of FIGS. 3A and 3B.
FIGS. 3A and 3B represent a functional block diagram of the printer system.
Figure 3A:
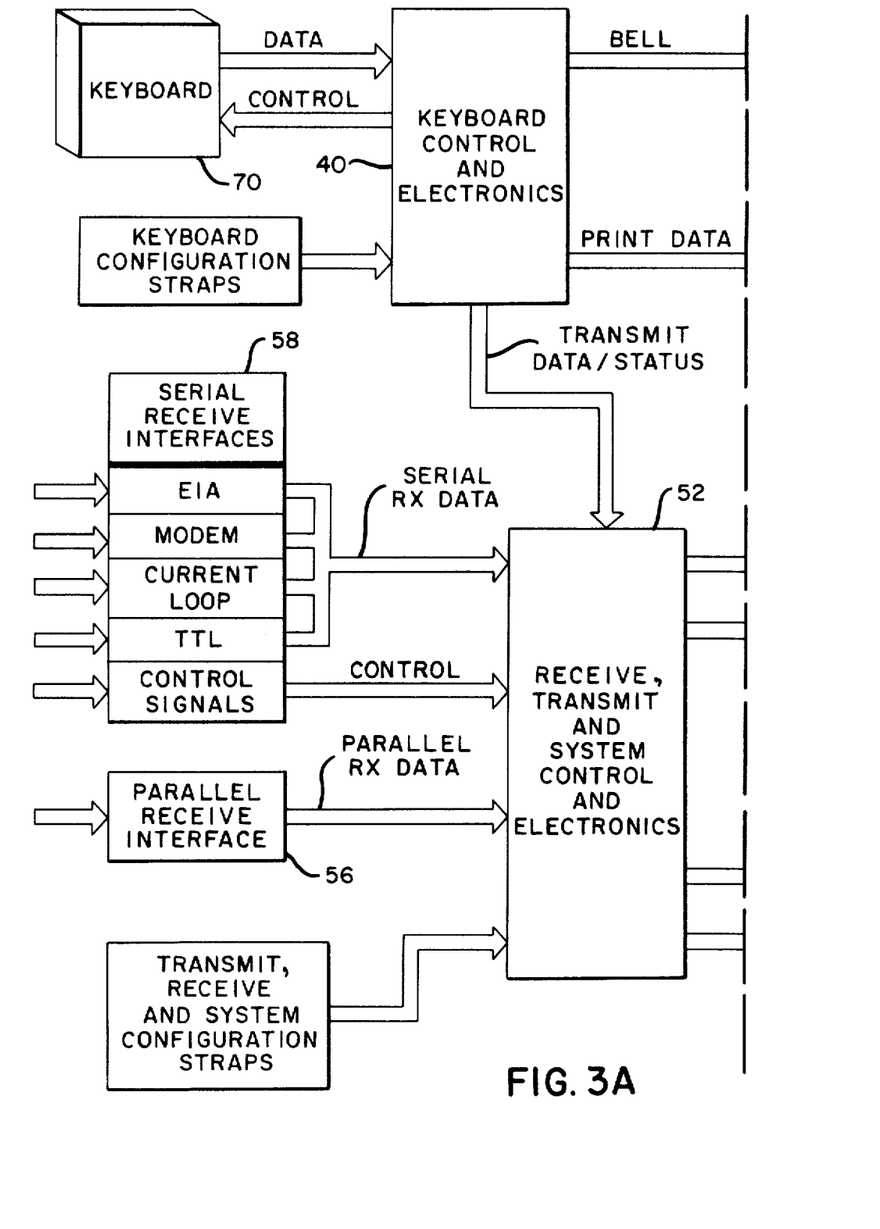
Figure 4:
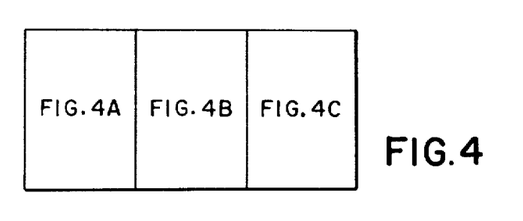
FIG. 4 is a view of the arrangement of FIGS. 4A, 4B and 4C.
Figure 4A:
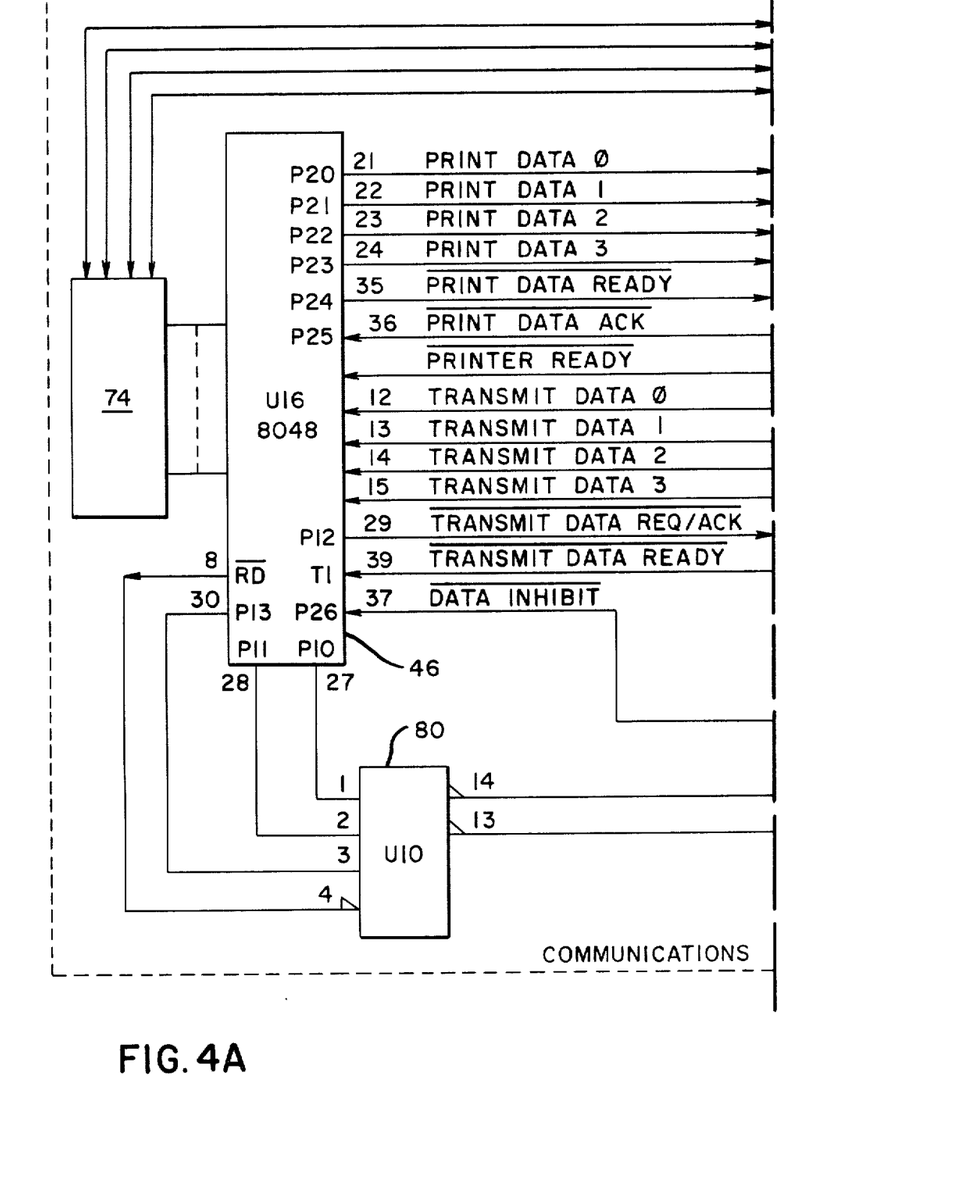
FIGS. 4A, 4B and 4C illustrate an interconnection diagram of the multiprocessor system.
Figure 4B:
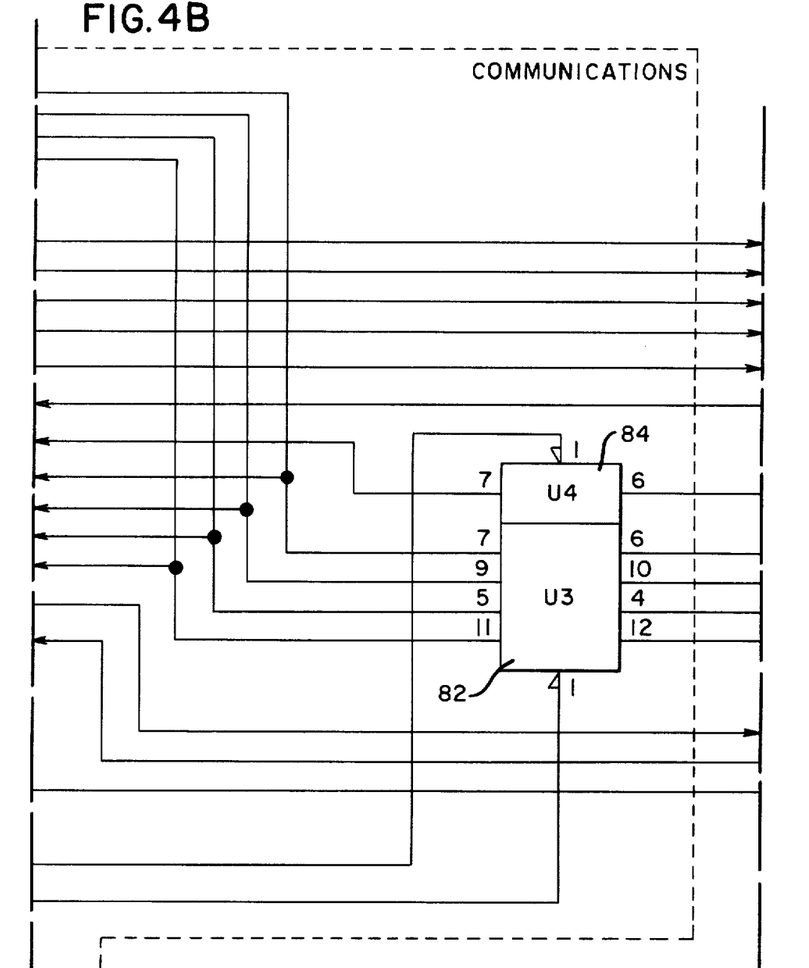
Figure 4C:
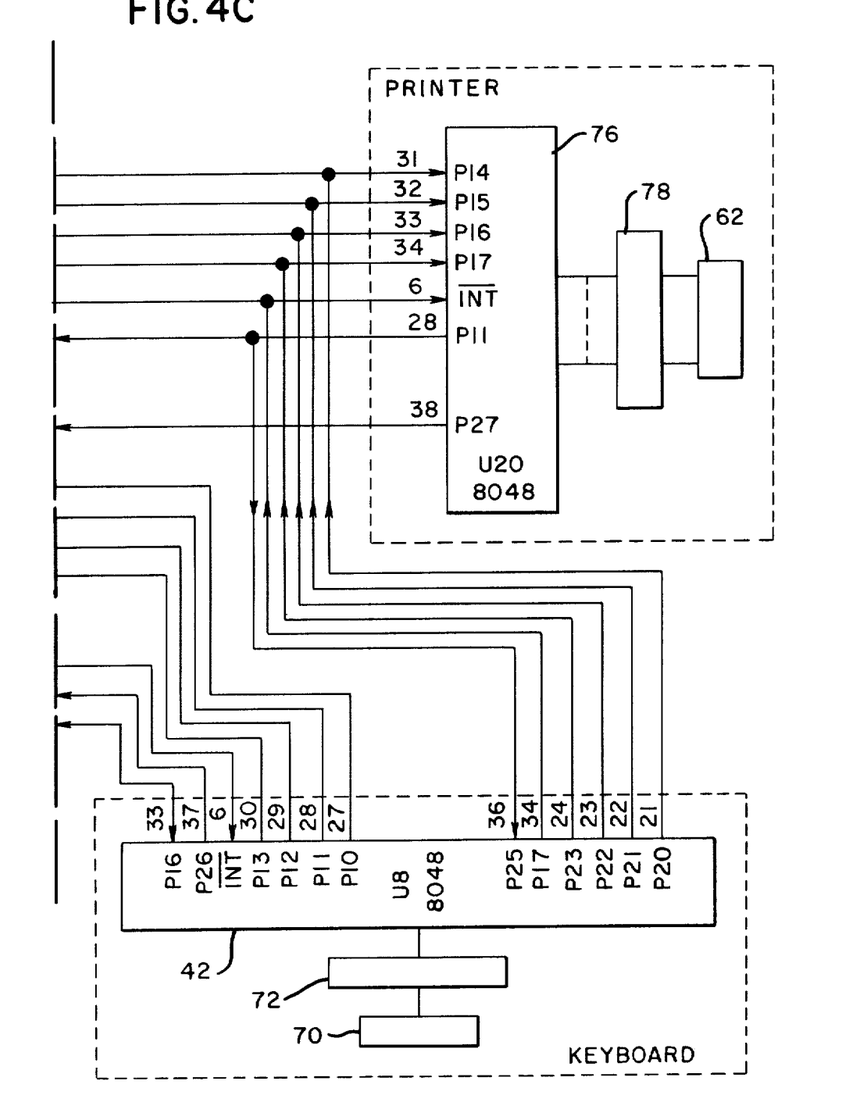

FIGS. 3A and 3B illustrate a functional block diagram and FIGS. 4A, 4B and 4C represent an interconnection diagram of the teleprinter terminal system which utilizes three self-contained microprocessing units operating in a manner wherein one microprocessor runs the keyboard, another runs the printer and a third processor handles all communications with the outside world. The printer processor is a slave to the communications processor or to the keyboard processor and the printer processor converts ASCII data that is transmitted to and received by such printer processor into a dot pattern that is printed by the printer. The key-board processor senses keys that are depressed and sends the data to the communications processor and/or the printer processor. The communications processor decodes serial or parallel input data and sends the data to the printer as well as encoding data from the keyboard into serial form for transmission thereof. When the power is turned on, each of the microprocessors starts running its individual program.

FIGS. 3A and 3B show a keyboard 70 interconnected to keyboard control and electronics 40 with the controlling element of such control and electronics being the keyboard processor. Transmit data/status is sent to the receive, transmit and system control electronics 52 from the keyboard control and electronics 40. The control and electronics 52 converts the parallel transmit data into serial form and sends such serial form data to the serial transmit interfaces 44. Serial receive data from the serial receive interfaces 58, and parallel receive data from the parallel receive interface 56 are processed by the controlling element of the control electronics which element is the communications processor. This received and processed data is sent as print data to the printer control and electronic 60 which also receives print data from the keyboard control and electronics 40. The controlling element of the printer control and electronics 60, which is the printer processor, controls the thermal printer 62. The bell 50 is controlled by the keyboard control and electronics 40 and also by the receive, transmit and system control and electronics 52. A power supply 64 is provided for the overall teleprinter system.

FIGS. 4A, 4B and 4C represent a diagram which shows the actual multiprocessor interconnection structure wherein the three self-contained microprocessors are identified as block elements 42, 46 and 76 representing the keyboard microprocessor, the communications microprocessor, and the printer microprocessor, respectively. The several microprocessors are also identified by the generic number 8048, as manufactured by Intel Corporation, and by physical location designators U8, U16 and U20. The numbers outside each processor and above each control line are the actual pin numbers of the 40 pin, 8048 processor package which includes the program in the read-only-memory portion.

The keyboard microprocessor 42 is connected via keyboard electronics 72 comprising a plurality of pull-up resistors to the keyboard 70. The communications processor 46 is connected to general purpose communications electronics 74 to provide all terminal input and output and also configurator straps. The printer microprocessor 76 is connected via printer electronics 78 comprising printer drivers to the printer mechanism 62. It is seen that the keyboard control and electronics 40 of FIG. 3A includes the resistors 72 and the processor 42, that the receive, transmit and system control and electronics 52 includes the communications electronics 74 and the processor 46, and that the printer control and electronics 60 includes the printer drivers 78 and the processor 76. The three microprocessors are connected by two, four-bit data buses which operate under similar protocol. Communication between the processors is on a byte basis and the byte is sent as two exchanges of four bits each.

The keyboard processor 42 and the communications processor 46 connect to the printer processor 76 by means of a first or primary bus of four bit capacity over the Print Data 0, 1, 2 and 3 lines, and their associated control lines including Print Data Ready, Print Data Ack and Printer Ready, the latter to communications only. The keyboard processor 42 connects to the communications processor 46 over the Transmit Data 0, 1, 2 and 3 lines and their associated control lines Transmit data Req/Ack and Transmit Data Ready. Data Inhibit is a bi-directional line that resolves contention on the Print Data lines. The blocks 80 and 82 are special purpose multiplexing electronics that allow the communications processor 46 to expand bi-directional pins 12, 13, 14 and 15 for other system uses. Block 82 in the nature of a driver is enabled by processor 46 via decoder 80 when the Transmit Data lines from the keyboard processor 42 are to be read. Block 84 is enabled, exclusively of the driver 82, when the Printer Ready line is to be sampled.

Figure 5:
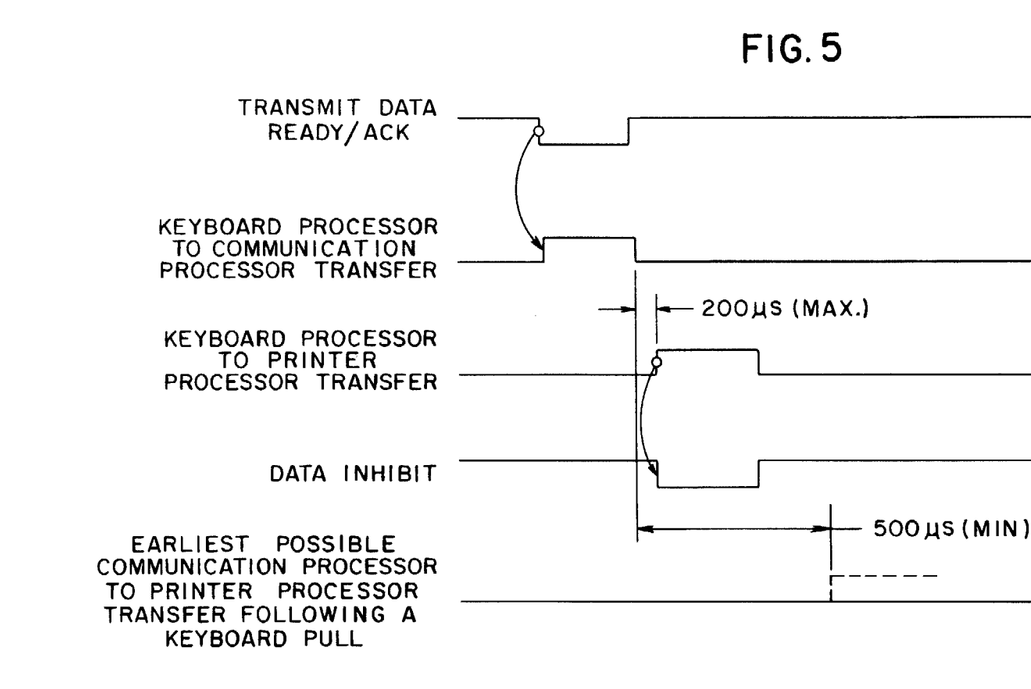
FIG. 5 is a transfer timing diagram.

FIG. 5 is a transfer timing diagram and illustrates how contention for the Print Data Bus, which is shared by the communications processor 46 and the keyboard processor 42, is resolved by use of the Data Inhibit line and an inherent processing delay within the communications processor 46.

The keyboard processor 42 is not allowed to send data to the printer processor 76 until the processor 42 has been polled by the communications processor 46 and has finished transferring the data it has available for the processor 46. This concept forces the keyboard processor 42 into using the print data bus at a time when there will be no contention with the communications processor 46. The communications processor, due to firmware overhead, is not able to use the print data bus for a minimum of 500 microseconds after a keyboard poll. Thusly, the keyboard 70 completes its transfer of data to the printer 62 by the time the communications processor 46 requires use of the bus.

Figure 6:
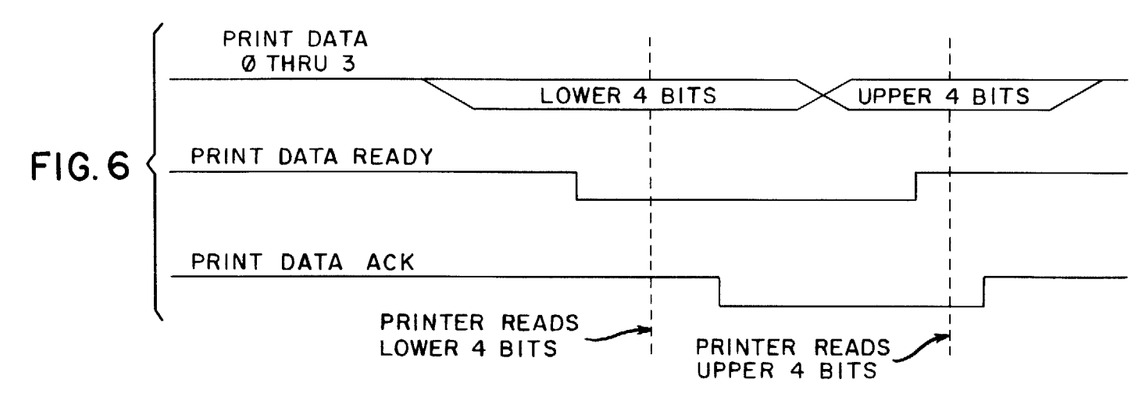
FIG. 6 is a timing diagram of the print data bus.

FIG. 6 shows the protocol of the print data bus over which data is sent to the printer processor 76 either by the keyboard processor 42 or by the communications processor 46. The sending processor, whether keyboard processor 42 or communications processor 46, places the lower nibble of data to be sent on the four bit bus and then lowers the print data ready line which causes the printer processor 76 to enter the interrupt routine. The printer processor 76 reads the data bus and then lowers the print data acknowledge line. The sending processor 42 or 46 which has been monitoring the acknowledge line sees the acknowledge line go low and responds by placing the upper nibble on the data bus and then raises the print data ready line. The printer processor 76 which has been monitoring the print data ready line sees the line go high and reads the data from the bus and then raises the acknowledge line. The sending processor 42 or 46 which has been monitoring acknowledge sees it go high and then raises all four bits of the bus, thus ending the exchange. The bus is brought high after the exchange because of the wired configuration between the keyboard processor 42 and the communication processor 46. If the bus was left in a low state, the hardware drive limitations of one microprocessor would not allow the other processor to bring the bus high for different data.

Figure 7:
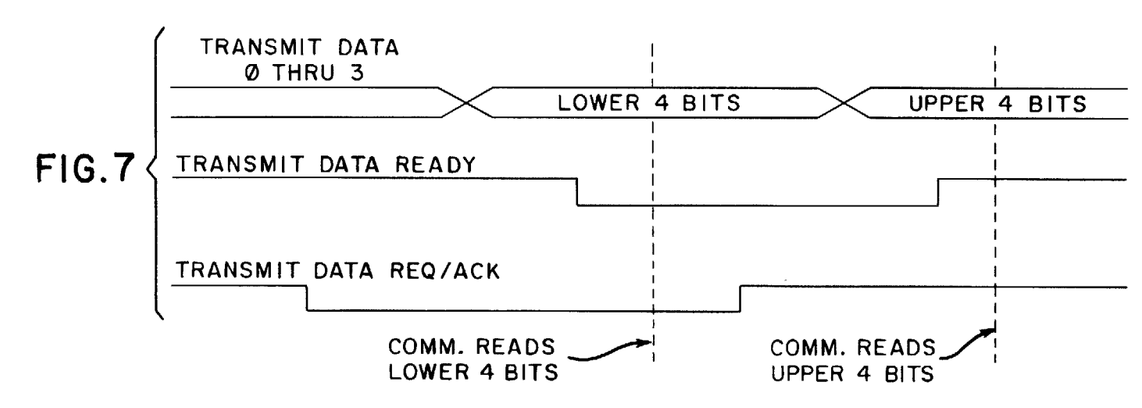
FIG. 7 is a timing diagram of the transmit data bus.

FIG. 7 shows the protocol of the transmit data bus wherein data is sent to the communications processor 46 over a second four bit data bus and such processor 46 polls the keyboard processor 42 for data by lowering the transmit data request acknowledge line which causes the keyboard processor 42 to enter the interrupt routine. The keyboard processor 42 places the lower nibble of its data on the data bus and then lowers the transmit data ready line. The communications processor 46 which has been monitoring the transmit data ready line, reads the bus and then raises the transmit data request acknowledge line. The keyboard processor 42 which has been monitoring transmit data request acknowledge line then places the upper nibble of data on the bus and raises the transmit data ready line. The communications processor 46 which has been monitoring transmit data ready line then reads the upper nibble and ends the exchange.

The printer processor 76 operates as a slave unit and receives its data over the four bit bus which is common to the keyboard processor 42 and to the communications processor 46, as seen in FIGS. 4A, 4B and 4C. All data including local control data such as last character visibility is received over this bus with the exception of the paper advance which can be sent over the data bus or sent by way of an input to the printer processor 76. The keyboard processor 42 shares the four bit data bus that connects the printer processor 76 and the communications processor 46. The keyboard 70 sends data through the keyboard processor 42 to the communications processor 46 over the second four-bit data bus. The communications processor 46 also receives a Printer Ready status from the printer processor 76 over a separate output line from the printer processor. The communications processor 46 or the keyboard processor 42 control usage of the print data bus to the printer processor 76 by means of a common input/output line between the two processors. The two, four-bit buses utilized in the teleprinter system operate under almost identical protocol in that both buses use an input strobe and an acknowledge. Communications between the processors is done in bytes but the four-bit bus forces the byte to be transferred in two, four-bit exchanges and both buses first exchange the data on the lower nibble.

The Data Inhibit line, shown as a bi-directional line in FIG. 4, resolves contention for this bus and is used by the communications processor 46 to stop the flow of data to the printer 62 when the apparatus experiences an out-of-paper condition. The keyboard processor 42 and the communications processor 46 monitor the line in a manner wherein when the keyboard processor 42 is ready to send data to the printer 62, the line is first checked and if the line is high the keyboard processor 42 lowers the line which is signalling or indicating that the bus is in use and then proceeds to send its data to the printer 62. When the exchange is complete, the keyboard 70 raises the data inhibit line.

If the keyboard processor 42 finds the data inhibit line low, the keyboard 70 will not send the data to the printer 62 and this data is effectively lost. The communications processor 46 follows exactly the same procedure as outlined above for use of the data inhibit line with the only exception being the paper-out condition. The communications processor 46, which monitors the paper-out sensor, will stop all data flow from the keyboard 70 or from the processor 46 when the paper-out condition is sensed by way of the processor 46 latching the data inhibit line low during such condition.

When the keyboard processor 42 is installed and operating properly, it will respond with an off-line status as a standard response to the first poll. The communications processor 46 starts a timer when the poll request is sent to the keyboard processor 42. If the keyboard processor 42 is not functioning or not present, the timer will expire and the communications processor 46 will assume that the teleprinter system is in a receive only (RO) configuration. In such (RO) configuration, on-line status is assumed and the baud and parity straps are monitored at all times for any changes. After the keyboard poll, the communications processor 46 will sound a bell to provide audible feedback that power was on.

At the same time as the conditions noted above, the printer processor 76 is performing a carriage return line feed sequence to bring the carriage to the start of line position. During this period of time, the printer 62 would not be able to maintain the printing rate if data were fed to it at any of the communication rates. Therefore, the printer processor 76 indicates this condition by maintaining the printer data ready line to the communications processor 46 in the high state until the carriage return line feed sequence is completed.

The communications processor 46 waits for the printer ready line to go active or to the low status before it proceeds to its operational loop. Thus all data from the outside world and from the keyboard 70 is withheld from the printer 62. When the printer ready line goes active, the processor 46 falls into its operational loop and polls the keyboard 70 at the character time of the strapped baud rate for unit status and for transmit data. As an example of the timing, it is noted that if the unit is strapped for 300 baud, the communications processor 46 will poll the keyboard processor 42 every 33 milliseconds. (Since the teleprinter sends 10 bit data at 300 baud, the bit time for 300 baud is 3.33 milliseconds and the time for ten bits is 33 milliseconds.)

The keyboard processor 42 always responds to a poll with a status byte or a key for the transmission when the on-line switch is down or depressed. When the on-line switch is not down, the keyboard processor 42 always responds to a poll with a status byte which indicates the position of the communications selection half duplex and on-line keys. When in the on-line half duplex mode, the keyboard 70 sends the key for transmit to the printer processor 76 as well as to the communications processor 46. When not on-line, the keyboard processor 42 sends all of its transmittable characters to the printer 62.

The system control is shared by the keyboard processor 42 and the communications processor 46, wherein the latter processor 46 provides a poll signal to the keyboard processor 42 at the strapped baud rate which causes printing action in half duplex and when the on-line key is not down to occur at the baud rate. The processor 46 also controls all Electronic Industry Association (EIA) lines, controls the system during paper-out conditions, handles keyboard and strap selection of the baud and parity settings, synchronizes the system on power-up, limits data input speed to the maximum printing speed or rate in the parallel receive-only (RO) mode, and also operates the bell signal.

The keyboard processor 42 routes keyboard data for transmit and/or print according to on-line and half or full duplex keys, switches between teletype and typewriter font according to its associated strap and also operates the bell.

In the operation of the terminal system, when power is turned on, all three processors 42, 46 and 76 start simultaneously and each processor proceeds with its program. The printer processor 76 performs a carriage return and line feed operation, and the keyboard processor 42 rings the bell. The communications processor 46 reads the strap and configures for baud and parity, whereupon it then polls the keyboard 70 after a delay of 33 milliseconds to determine if the teleprinter is in an RO or a KSR unit. If the terminal is a keyboard send-/receive (KSR) model, the keyboard processor 42 responds with a status byte. If the terminal is a receive-only (RO) model, the communications processor 46 times out and indicating thereto that the terminal is an RO model.

Henceforth, if the terminal is a KSR model, the communications processor 46 polls the keyboard processor 42 at the baud rate, for example, if the baud rate is 300, the keyboard processor is polled every 33 milliseconds. When the keyboard processor 42 is interrupted by a poll, such processor sends a data byte for the depressed key to the communications processor 46 in accordance with the above described protocol. The communications processor 46 then converts the data to serial form to be transmitted to the remote device. If no key was depressed or if the status of the terminal has changed or if the terminal is off-line (not connected to a remote device), the keyboard processor 42 instead sends a status byte to the communications processor 46. In this way, the keyboard processor 42 always responds to the poll of the communications processor 46. The status bit indicates the position of the communication selection (COM-SEL), half duplex and on-line keys.

The positions of the on-line and half duplex keys condition the operation of the terminal in one of three ways, namely; off-line, on-line and half duplex, and on-line and full duplex. In the off-line condition, no data is received or transmitted, and data input by the keyboard 70 is printed. In the on-line and half-duplex condition, incoming data is received from the remote device and is printed, and data input by the keyboard 70 is transmitted to the remote device and is printed. And, in the on-line and full duplex condition, incoming data is received and is printed, and data input by the keyboard 70 is transmitted to the remote device.

The keyboard processor 42 is only allowed to send data to the printer 62 within its poll service routine by reason to prevent data collisions and to synchronize printing and transmission of data in half duplex. If a key is to be printed (off-line or on-line and half duplex), the data byte for the depressed key is sent to the printer processor 76 in accordance with the above described protocol immediately after the keyboard-to-communications processor transfer is completed. This configuration forces data flow to the printer 62 at the character time of the baud rate which is also the character time of the transmission rate. Data collisions on the print data bus are avoided because the communications processor 46 knows when the keyboard processor 42 is using the bus. This arrangement, along with the bidirectional data inhibit line, prevents data collisions or a contention problem for the data bus to the printer 62.

All data received from the parallel or serial interfaces (outside world) is received by the communications processor 46 and this data is sent to the printer 62 by way of the print data bus to the printer processor 76. To insure that the data is not fed to the printer 62 faster than a 30 character per second throughput, the communications processor 46 will delay the time of 33 milliseconds after receiving the input strobe and before it clears the busy line which is connected to the host to thereby limit the host to a data rate equal to or less than 30 characters per second on the parallel interface. Greater data rates would cause loss of data by the printer 62.

When the keyboard processor 42 intends to send data on the print data bus to the printer processor 76, the processor 42 first checks the line. If the line is low, no data is sent and that data is lost. If the line is high, the processor 42 lowers the line for the duration of the transmission of the data and then raises the line.

In the out-of-paper condition, (when the unit is powered up without the presence of paper 18 or when it runs out of paper during operation) the communications processor 46 holds the data inhibit line low which stops the keyboard processor 42 or the communications processor 46 from sending data to the printer 62. The only input the printer 62 receives at this time is a paper advance signal over one of its input lines. This action prevents the printer 62 from printing on the platen 26 when paper is out, which is a condition that would cause excessive wear of the print head 28 and would complicate paper loading.

Data is not allowed to flow to the printer 62 until the paper 18 is advanced past the print head 28 by use of the paper advance key, which is the only key that is active on the keyboard during the paper out condition. The communications processor 46 monitors the paper advance line from the keyboard processor 42 to the printer 62 and counts the number of paper advance key activations and when fifteen advances have been made and the paper sensor detects paper, the communications processor 46 will raise the data inhibit line.

Received data coming in from the remote device is sent to the printer processor 76 by the communications processor 46 on the print data bus at a time when the keyboard processor 42 is not using the bus. if the data is serial EIA, it is first converted to parallel to be sent to the printer processor 76. If the data is parallel data, and to insure that the data is not fed to the printer 62 faster than the printer can handle such data, the communications processor 46 delays 33 milliseconds (for a 30 cps rate) after receiving the input strobe and before clearing the busy line.

The communications processor 46 senses the paper-out condition by monitoring the paper-out sensor. As stated previously, the processor 46 lowers the data inhibit line to prevent keyboard-to-printer processor communication. Any data input from the keyboard 62 or received from a remote device is lost.

When a paper-out condition is detected, the processor 46 will indicate paper-out to the outside world and accordingly notify the remote device by inactivating EIA secondary Request-to-Send or EIA Data Terminal Ready signals and the parallel interface paper-out control signals. The bell will be activated once for a period of one-half second by the communications processor 46 when it sees a paper-in to paper-out state change.

If the unit is strapped for the Data Terminal Ready (DTR) drop option, the communications processor 46 will inactivate the EIA-DTR control signal and will sound the bell continuously while in the paper-out mode. When the unit is strapped for parallel operation, this strap will produce the same results, however, DTR has no meaning in a parallel interface. When the unit exits the paper-out mode, all control signals that were affected are restored to their normal states.

During a carriage return operation or a line feed operation, the printer is not able to maintain the 30 characters per second throughput. At this time, the printer processor 76 raises the printer ready line between the printer processor and the communications processor 46, thus inhibiting the flow of data to the printer processor.

In a keyboard send/receive (KSR) model, the operator can temporarily change the band and parity from the strapped condition by use of the COM-SEL key on the keyboard. The terminal cannot be in the numeric mode at this time by reason of inactivation of the COM-SEL key. When the communication selection (COM-SEL) key is depressed, a status byte is sent by the keyboard processor 42 to the communications processor 46 to indicate incoming data from the outside world and stops keyboard data to the printer 62 by lowering the data inhibit line. No characters are tramsmitted at this time.

The processor 46 then screens every character sent by the keyboard 70 for a control −B, a control −P or a control −C key. When a control −B is received, the processor 46 sets itself to the next baud rate after which the processor 46 sends a message to the printer 62 stating the new baud and parity settings.

A control −P will set the communications to the next parity setting after which the processor 46 sends a message to the printer 70 starting the new baud and parity setting. Reception of either key will cause the processor 46 to continue stepping through the available baud and parity settings.

When a control −C is received, the communications processor 46 will print the current baud and parity settings and if no changes have been made using the control −P or control −B keys, then reception of a control −C key will cause the current strapped baud and parity settings to be printed.

The communication selection (COM-SEL) key will allow selection of baud and parity any time that it is depressed. When the communication select mode is entered, no control signals are affected and selection of half or full duplex and on-line is possible. Release of the COM-SEL key places the terminal in condition for normal operation.

In a summary of the functions performed by the several microprocessors of the teleprinter terminal system, the printer microprocessor 76 provides for generation of the characters to be printed, provides for controlling operation of the stepping motor which moves the print head 28, and controls the firing of the thermal elements for printing the matrix of dots in forming the characters. Additionally, the printer processor 76 communicates with the other two processors 42, 46, and performs the functions of print head carriage return and line feed of the paper 18 when the apparatus is in a non-printing condition.

The keyboard microprocessor 42 performs the functions of scanning the keyboard 70, committing the information to memory, and then transferring the information or data to the communication processor 46 and to the printer processor 76. Additionally, the functions of the processor 42 include performing the N-key rollover and repeat operations.

The communications microprocessor 46 communicates with the outside world (either EIA serial or parallel manner) and also with the other two processors 42, 76 in the transferring or exchanging of data.

It is thus seen that herein shown and described is a teleprinter terminal system which includes a plurality of self-contained microprocessors which run the individual programs and are interconnected by use of two, four-bit buses for the exchange of data. The control responsibility of each microprocessor is increased by use of the "nibble" bus concept and the bus structure reduces the amount of circuitry needed to provide the functions required of a keyboard send/receive teleprinter terminal. The terminal system of the present invention enables the accomplishment of the objects and advantages mentioned above, and while a preferred embodiment of the invention has been disclosed herein, variations thereof may occur to those skilled in the art. It is contemplated that all variations and modifications not departing from the spirit and scope of the invention hereof are to be construed in accordance with the following claims.

We claim:

1. A teleprinter terminal system comprising a
   printer mechanism, a
   printer microprocessor for generating characters to be printed and operably associated with said printer mechanism for operating thereof,
   communication means having an input comprising a parallel interface for receiving information and having an input/output comprising separate serial interfaces for receiving and transmitting information, a
   communications microprocessor operably associated with said communication means for operating thereof and for transmitting data to said printer microprocessor,
   keyboard means operable to enter data for transmission thereof to said communications microprocessor for operation in one mode wherein data is output from said system and operable to enter data for transmission thereof to said printer microprocessor for operation in another mode wherein data is printed by said printer mechamism, a
   keyboard microprocessor operably associated with said keyboard means for sensing said keyboard entered data and for transmitting said data to said printer microprocessor or to said communications microprocessor, a
   first bus connected with said printer processor, with said communications processor and with said keyboard processor for interconnecting the three processors for transmitting data in dual exchanges whereby the three processors are connected for providing independent storage and release of data for the printing operation, and a
   second bus connecting said communications processor and said keyboard processor for transmitting data in dual exchanges whereby the two processors are connected for providing independent storage and release of data for transmittal thereof from said system.

2. The system of claim 1 wherein said printer mechanism includes a thermal matrix printer.

3. The system of claim 1 wherein said printer microprocessor comprises a self-contained single element capable of storing data and releasing data to said printer mechanism.

4. The system of claim 1 wherein said communication means includes interface for serially receiving standard data in asynchronous manner in one mode of operation or for receiving data in parallel manner in another mode of operation.

5. The system of claim 1 wherein said communications microprocessor comprises a self-contained single element capable of storing data and releasing data in modem format.

6. The system of claim 1 wherein said keyboard means includes interface for providing coded data to said printer and for transmitting data to said communication means in half or in full duplex mode.

7. The system of claim 1 wherein said keyboard microprocessor comprises a self-contained single element capable of sensing keyboard entered data, storing data and releasing data to said communications processor or to said printer processor.

8. A printing system comprising
   printer mechanism movable in lateral direction, a
   self-contained printer processor for generating characters and operably associated with said printer mechanism for driving thereof, a
   self-contained communications processor having an input comprising a serial interface and a parallel interface for reception of remote data and a serial interface for transmission of data to said printer processor, a
   keyboard operable to enter data, a
   self-contained keyboard processor operable to sense the keyboard entered data and for transmitting said data to said printer processor for printing thereof or to said communications processor for output from said system,
   first bus means interconnected with the three processors to transmit data to the communications processor and to the printer processor in dual exchanges whereby the three processors are connected for providing independent storage and release of data for the printing operation, and
   second bus means connected to transmit data from said keyboard processor to said communications processor for transmitting data in lower and upper bit exchanges whereby the two processors are connected for independent storage and release of data for transmittal thereof from said system.

9. The printing system of claim 8 wherein said printer mechanism includes a thermal matrix printer.

10. The printing system of claim 8 wherein said first bus means includes an interface between said communications processor and said printer processor for acknowledging print data.

11. The printing system of claim 8 wherein said second bus means includes an interface between said communications processor and said keyboard processor for inhibiting data therebetween and for inhibiting data to said printer processor.

12. A method of printing data by use of a printer processor wherein data is received from a communications processor in one mode or from a keyboard processor in another mode comprising the steps of:

providing a bus interconnecting said processors for transmission of data input to the communications processor and transmitted to the printer processor in said one mode or input to the keyboard processor and transmitted to the printer processor in said another mode, placing by the communications processor or the keyboard processor a lower exchange of data on the bus to be transmitted for printing, lowering a print data ready line to cause the printer processor to interrupt the routine, reading the lower exchange of data on the data bus by the first printer processor, lowering a print data acknowledge line after reading the lower exchange of data, placing by the communications processor or the keyboard processor an upper exchange of data on the bus to be transmitted for printing, raising the print data ready line, reading the upper exchange of data on the data bus by the printer processor, raising the print data acknowledge line after reading the upper exchange of data, and raising the bus by the communications processor or by the keyboard processor to end the exchange of data to be printed.

* * * * *